United States Patent Office 2,987,540
Patented June 6, 1961

2,987,540
PROCESS FOR THE PREPARATION OF N-SUB-STITUTED AMINOBUTYRIC ACID ESTERS

Wilhelm Jakob Kaiser, Dusseldorf-Holthausen, Germany, assignor to Henkel & Cie, G.m.b.H., Dusseldorf-Holthausen, Germany, a corporation of Germany
No Drawing. Filed Sept. 18, 1956, Ser. No. 610,668
Claims priority, application Germany Sept. 21, 1955
6 Claims. (Cl. 260—482)

This invention relates to a process for the production of N-substituted aminobutyric acid esters, and more particularly to the preparation of N,N'-disubstituted bis-β-aminobutyric acid alkyl esters and similar N,N',N''-trisubstituted aminobutyric acid alkyl esters from ethyl acetoacetate and diamines or polyamines.

I have found that industrially useful aminobutyric acid alkyl esters are obtained by reacting ethyl acetoacetate with a diamine or triamine and thereafter hydrogenating the reaction product in the presence of a hydrogenation catalyst. The hydrogenated products thus obtained are useful as excellent hardeners for epoxide resins on the basis of epoxy-ethers and epoxy-thioethers. The compounds obtained as above described used as hardeners are especially advantageous because they also give the epoxide resins a plasticizing effect. If it is desired to obtain especially flexible resins, then the amount of hardeners preferably is 30–45 weight percentages with regard to the weight of the epoxide compound.

If the ethyl acetoacetate is reacted with a diamine, the hydrogenation product has the structural formula

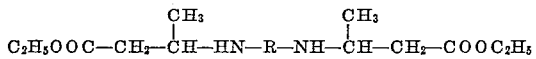

and if the amino reactant is a triamine, the hydrogenation product has the structural formula

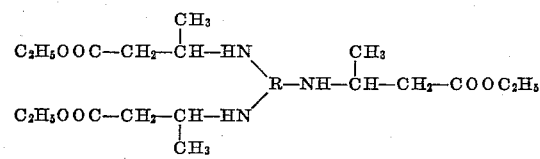

In these formulas R indicates the hydrocarbon radical of the diamine or triamine, respectively.

Diamines which may be reacted with ethyl acetoacetate to form the N-substituted aminobutyric acid esters in accordance with the invention are, for example, aliphatic diamines with straight or branched carbon chains, such as ethylene diamine, propylene diamine, tetramethylene diamine, hexamethylene diamine, 1,6-diamino-3-methyl hexane, 1,6-diamino-2-methyl hexane and similar aliphatic diamino compounds, as well as cyclo aliphatic diamines, such as ortho-, meta- or para-diamino cyclohexane. The process according to the present invention is, however, not limited to the reaction of aliphatic and cyclo-aliphatic diamines with ethyl acetoacetate and may be carried out in an analogous manner with aliphatic-aromatic or aromatic diamines, such as ortho-, meta- or para-phenylene diamine, wherein the aromatic radical may carry alkyl substitutents in addition to the amino groups such as in para-xylylene diamine. Finally, the reaction herein described is also applicable to polyamines, such as 1,2,3-triamino propane.

The initial reaction between the ethyl acetoacetate and the amino compound may if desired be carried out in the presence of inert solvents. Suitable solvents for this purpose are, for example, decahydronaphthalene, tetrahydronaphthalene, benzene, gasoline, toluene or chlorobenzene.

To bring about the reaction between the ethyl acetoacetate and the amino compound the entire quantity of these reaction components may be brought together at the same time in the presence of a suitable inert solvent if desired, or alternately one of the reaction components may be slowly added to the other reaction component accompanied by stirring, also in the presence of a suitable inert solvent if desired. It is preferred that an excess amount of ethyl acetoacetate is reacted with the amino compound. As a rule a certain amount of heat of reaction is generated when the individual reaction components are brought together so that it is not necessary to supply heat to the reaction mixture from outside sources. The water split off during the reaction is discontinuously or continuously removed from the reaction mixture either by simple decantation or by distillation at moderate temperatures in a vacuum. After all of the reaction components have been brought together and the reaction has gone to substantial completion the reaction mixture is preferably allowed to stand for a short period of time at slightly elevated temperatures. Subsequently the excess ethyl acetoacetate and the solvent medium are distilled off.

The solvent mixture thus obtained may be used for the preparation of the next batch of one of the reaction components after the amount of ethyl acetoacetate consumed in the previous reaction has been replaced by fresh ethyl acetoacetate.

The reaction product remaining behind after removal of the solvent and the excess ethyl acetoacetate is dissolved in a fresh batch of inert solvent, such as decahydronaphthalene, and the resulting solution is subjected to hydrogenation in the presence of a hydrogenation catalyst. If desired the hydrogenation step may be carried out at elevated pressures and at slightly elevated temperatures, for example, between 120 to 160° C. The use of metallic nickel as the hydrogenation catalyst has proved to be particularly advantageous. The hydrogenation may be carried out by any suitable known method, for example, by adding the hydrogenation catalyst directly to the solution of the material to be hydrogenated in a suitable solvent or, vice versa by introducing the solution into an autoclave already containing the hydrogenation catalyst. Still another method comprises adding the hydrogenation catalyst to the substance to be hydrogenated in the form of a suspension in a suitable solvent. The autoclave is then closed, hydrogen is introduced and heat is subsequently applied so as to maintain the desired temperature (about 120 to 160° C.) and the desired internal pressure (about 30 to 150 atm. gauge). The hydrogenation reaction has gone to completion when no more hydrogen is consumed which is indicated by the fact that the internal pressure remains constant at a given temperature.

The separation of the hydrogenation product may be carried out in a very simple fashion by filtering off the catalyst and distilling off the solvent in vacuo from the filtrate. The disubstituted or trisubstituted N-β-aminobutyric acid esters produced in this manner may, if desired, be transformed into the water soluble salts of the corresponding carboxylic acids in accordance with methods well known in the art.

The following examples will further illustrate the present invention and enable others skilled in the art to understand the invention more completely. There is no intention on my part, however, to limit the invention to the particular examples given below.

Example I 390 parts by weight ethyl acetoacetate were slowly added to 105 parts by weight hexamethylene diamine while stirring and care was taken through cooling that the temperature of the reaction mixture did not exceed 60° C. After allowing the mixture to stand for 15 hours at 55° C., the water which separated out as the upper layer (32 parts by weight) was separated and thereafter the remainder of the water was removed in vacuo at 50 to 55° C. Subsequently, the excess ethyl acetoacetate was distilled in vacuo (4 mm. bath temperature up to 110° C.) The viscous residue (308 parts by weight) remained behind which was dissolved in equal amounts of decahydronaphthalene and then hydrogenated at an elevated pressure (80 atm. gauge, 20° C.) at 120 to 160° C. in the presence of 5% of a nickel catalyst which had been previously reduced at 250° C.

After filtering off the catalyst and distilling the decahydronaphthalene in vacuo from a bath heated to about 110° C., 310 parts by weight of N,N'-hexamethylene-bis-(β-aminobutyric acid ethyl ester), were obtained. This amount was virtually the theoretical yield. The product was obtained with a great degree of purity because the melting point (70 to 71° C.) was not changed by recrystallization from benzene.

Under the same conditions 284 parts by weight N,N'-tetramethylene-bis-(β-aminobutyric acid ethyl ester) is obtained, when 82 parts by weight tetramethylene diamine was used instead of hexamethylene diamine.

40 parts by weight N,N'-hexamethylene-bis-(β-aminobutyric acid ethyl ester), obtained as above described, were mixed with 100 parts by weight epoxide resin (epoxide oxygene content 7%, molecular weight 400). The so obtained homogeneous solution was heated under stirring two hours at a temperature of 140° C. After cooling a hardened especially flexible epoxide resin is obtained.

Example II 108 parts by weight p-phenylenediamine were added in small portions over a period of two hours to 390 parts by weight of ethyl acetoacetate at 50° C. while the reaction vessel was evacuated with an aspirator pump. The reaction mixture was then stirred in vacuo at 50° C. for an additional 18 hours. Toward the end of this period the bath temperature was increased to 100° C. and the vacuum was increased to 4 mm. The residue (328 parts by weight) solidified upon cooling into coarse crystals which melted at 138 to 139° C. upon recrystallization from alcohol. 215 parts by weight of this recrystallized product were dissolved in twice the amount of decahydronaphthalene and hydrogenated at 130 to 140° C. at a hydrogenation pressure of 50 atmospheres gauge (20° C.) in the presence of 2.5% of a nickel catalyst which had previously been reduced at 250° C. Thereafter the catalyst was filtered off and the filtrate was freed in vacuo from decahydronaphthalene. 200 parts by weight of very pure N,N'-p-phenylene-bis-(β-aminobutyric acid ethyl ester) were obtained.

Example III 108 parts by weight m-phenylene diamine is added in small portions over a period of two hours to 390 parts by weight of ethyl acetoacetate at 50° C. while the reaction vessel is evacuated with an aspirator pump. The reaction mixture is then stirred in vacuo at 50° C. for an additional 18 hours. Toward the end of this period the bath temperature is increased to 100° C. and the vacuum is increased to 4 mm. Thereafter the residue (326 parts by weight) is mixed before cooling with 750 parts by weight decahydronaphthalene and hydrogenated at 135–150° C. at a hydrogenation pressure of 50 atmospheres gauge (20° C.) in the presence of 2.5% of a nickel catalyst which had previously been reduced at 250° C. Thereafter the catalyst is filtered off and the filtrate is freed in vacuo from decahydronaphthalene, 197 parts by weight N,N'-m-phenylene-bis-(β-aminobutyric acid ethyl ester) is obtained.

While I have illustrated certain specific embodiments of my invention it will be understood that I do not wish to be limited to these specific embodiments and that various changes and modifications may be made without departing from the spirit of the invention or the scope of the appended claims.

I claim:
1. The process of producing N,N'-substituted and N,N',N''-substituted β-aminobutyric acid ethyl esters, which comprises hydrogenating the product obtained from a reaction between an excess amount of ethyl acetoacetate with a compound selected from the group consisting of alkylene, cyclohexyl and phenylene diamines and alkylene triamines at a temperature not exceeding about 100° C., said hydrogenation being conducted at a temperature of 120 to 160° C. and a pressure between 30 and 150 atmospheres gauge in the presence of a hydrogenation catalyst.

2. The process of producing N,N'-disubstituted β-aminobutyric acid ethyl esters, which comprises hydrogenating the product obtained from a reaction between an excess amount of ethyl acetoacetate with a diamine selected from the group consisting of alkylene, cyclohexyl and phenylene diamines at a temperature not exceeding about 100° C., said hydrogenation being conducted at a temperature of 120 to 160° C. and a pressure between 30 and 150 atmospheres gauge in the presence of a hydrogenation catalyst.

3. The process of producing N,N'-disubstituted β-aminobutyric acid ethyl esters, which comprises hydrogenating the product obtained from a reaction between an excess amount of ethyl acetoacetate with a compound selected from the group consisting of alkylene, cyclohexyl and phenylene diamines and alkylene triamines at a temperature not exceeding about 100° C., said hydrogenation being conducted at a temperature between 120 and 160° C. and a pressure between 30 and 150 atmospheres gauge in the presence of a nickel hydrogenation catalyst.

4. The process of producing N,N'-disubstituted β-amino ethyl esters, which comprises hydrogenating the product obtained by admixing a diamine selected from the group consisting of alkylene, cyclohexyl and phenylene diamines with more than an equivalent amount of ethyl acetoacetate per amino group in the diamine at a temperature not exceeding about 100° C., allowing the mixture to stand for an extended period of time at substantially room temperature, and removing the water formed thereby, said hydrogenation being conducted at a temperature from 120° C. to 160° C. and a pressure from 30 to 150 atmospheres gauge in the presence of a nickel hydrogenation catalyst.

5. The process of producing N,N'-hexamethylene-bis-(β-aminobutyric acid ethyl ester) which comprises hydrogenating the product obtained from a reaction between an excess amount of ethyl acetoacetate with hexamethylene diamine at a temperature not exceeding about 100° C., said hydrogenation being conducted at a temperature from 120° C. to 160° C. and a pressure from 30 to 150 atmospheres gauge and in the presence of a nickel hydrogenation catalyst.

6. The process of producing N,N'-p-phenylene-bis-(β-aminobutyric acid ethyl ester) which comprises hydrogenating the product obtained from a reaction between an excess amount of ethyl acetoacetate with p-phenylene diamine at a temperature not exceeding about 100° C., said hydrogenation being conducted at a temperature from 120° C. to 160° C. and a pressure from 30 to 150 atmospheres gauge and in the presence of a nickel hydrogenation catalyst.

References Cited in the file of this patent

UNITED STATES PATENTS

| | | |
|---|---|---|
| 2,312,082 | Dietrich | Feb. 23, 1943 |
| 2,420,122 | Chenicek | May 6, 1947 |
| 2,428,353 | Bersworth | Oct. 7, 1947 |
| 2,744,086 | Mowry et al. | May 1, 1956 |

OTHER REFERENCES

Beilstein: Band XIII, Vierte Auflage, page 106 (1930).
Schlesinger: Ber., vol. 47, pp. 2406–16 (1914).
Jacini: Chemical Abstracts, vol. 33, 8616 (1939).
Organic Reactions, vol. IV, page 191 (1948) Wiley.
Organic Reactions, vol. IV, pp. 229, 232–3, 239, J. Wiley, 1948.